(12) United States Patent
Arteaga et al.

(10) Patent No.: US 10,779,084 B2
(45) Date of Patent: Sep. 15, 2020

(54) AUTOMATIC DISCOVERY AND LOCALIZATION OF SPEAKER LOCATIONS IN SURROUND SOUND SYSTEMS

(71) Applicants: Dolby Laboratories Licensing Corporation, San Francisco, CA (US); DOLBY INTERNATIONAL AB, Amsterdam Zuidoost (NL)

(72) Inventors: Daniel Arteaga, Barcelona (ES); Giulio Cengarle, Barcelona (ES); David Matthew Fischer, San Jose, CA (US); Antonio Mateos Sole, Barcelona (ES); Davide Scaini, Barcelona (ES); Alan J. Seefeldt, Alameda, CA (US)

(73) Assignees: Dolby Laboratories Licensing Corporation, San Francisco, CA (US); Dolby International AB, Amsterdam Zuidoost (NL)

( * ) Notice: Subject to any disclaimer, the term of this patent is extended or adjusted under 35 U.S.C. 154(b) by 0 days.

(21) Appl. No.: 16/336,861

(22) PCT Filed: Sep. 28, 2017

(86) PCT No.: PCT/US2017/054169
§ 371 (c)(1),
(2) Date: Mar. 26, 2019

(87) PCT Pub. No.: WO2018/064410
PCT Pub. Date: Apr. 5, 2018

(65) Prior Publication Data
US 2019/0253801 A1    Aug. 15, 2019

Related U.S. Application Data

(60) Provisional application No. 62/430,473, filed on Dec. 6, 2016.

(30) Foreign Application Priority Data

Sep. 29, 2016  (ES) .................................. 201631264
Nov. 29, 2016  (EP) .................................. 16201136

(51) Int. Cl.
*H04R 5/02* (2006.01)
*H04R 5/04* (2006.01)
(Continued)

(52) U.S. Cl.
CPC .................. *H04R 5/04* (2013.01); *G01S 5/18* (2013.01); *H04R 3/005* (2013.01); *H04R 3/12* (2013.01);
(Continued)

(58) Field of Classification Search
CPC . H04R 5/04; H04R 3/005; H04R 3/12; H04R 5/02; H04R 5/027; H04R 2205/24;
(Continued)

(56) References Cited

U.S. PATENT DOCUMENTS 7,586,513 B2    9/2009    Muren
7,864,631 B2    1/2011    Van Leest
(Continued)

FOREIGN PATENT DOCUMENTS

WO    2006/131894    12/2006

OTHER PUBLICATIONS

Tervo, S., "Maximum likelihood estimation of loudspeaker locations from room impulse responses", Nov. 2011, Inspec, Journal of the Audio Engineering Society, vol. 59, n 11, pp. 845-857.
(Continued)

*Primary Examiner* — Disler Paul

(57) ABSTRACT

Embodiments are described for a method for localizing a set of speakers (106) and microphones (108), having only the times of arrival between each of the speakers and micro-
(Continued)

phones. An autodiscovery process (107) uses an external input to set: a global translation (3 continuous parameters), a global rotation (3 continuous parameters), and discrete symmetries, i.e., an exchange of any axis pairs and/or reversal of any axis. Different time of arrival acquisition techniques may be used, such as ultrasonic sweeps or generic multitrack audio content. The autodiscovery algorithm is based in minimizing a certain cost function, and the process allows for latencies in the recordings, possibly linked to the latencies in the emission.

21 Claims, 8 Drawing Sheets

(51) Int. Cl.
  *H04R 5/027*   (2006.01)
  *H04R 3/12*   (2006.01)
  *H04S 7/00*   (2006.01)
  *H04R 3/00*   (2006.01)
  *G01S 5/18*   (2006.01)

(52) U.S. Cl.
  CPC ............... *H04R 5/02* (2013.01); *H04R 5/027* (2013.01); *H04S 7/301* (2013.01); *H04R 2205/024* (2013.01); *H04R 2420/05* (2013.01); *H04R 2420/07* (2013.01); *H04S 2400/01* (2013.01)

(58) Field of Classification Search
  CPC .. H04R 2421/05; H04S 2400/01; H04S 7/301
  USPC .............................. 381/300, 303, 307, 58–59
  See application file for complete search history.

(56) References Cited

U.S. PATENT DOCUMENTS

| | | | |
|---|---|---|---|
| 8,279,709 | B2 | 10/2012 | Choisel |
| 9,031,268 | B2 | 5/2015 | Fejzo |
| 9,215,542 | B2 | 12/2015 | Silzle |
| 2010/0195444 | A1 | 8/2010 | Choisel |
| 2011/0091055 | A1 | 4/2011 | Leblanc |
| 2011/0123054 | A1 | 5/2011 | Adamson |
| 2012/0288124 | A1* | 11/2012 | Fejzo ..................... H04R 5/02 381/303 |
| 2014/0119552 | A1 | 5/2014 | Beaucoup |
| 2014/0204716 | A1 | 7/2014 | Kleijn |
| 2015/0003631 | A1* | 1/2015 | Ise ......................... H04R 29/00 381/92 |
| 2015/0163616 | A1 | 6/2015 | Chatterjee |
| 2017/0303039 | A1* | 10/2017 | Iyer ...................... G05B 13/027 |
| 2018/0139560 | A1* | 5/2018 | Shi ......................... H04R 3/005 |

OTHER PUBLICATIONS

Gunel, B., "Loudspeaker localization using B-format recordings", Oct. 19-22, 2003, IEEE Xplore, Applications of Signal Processing to Audio and Acoustics, 2003 IEEE Workshop on.

Nielsen, J.K., et. al. "Real-time loudspeaker distance estimation with stereo audio", 2015 23rd European Signal Processing Conference (EUSIPCO) Year: 2015, IEEE Conferences, pp. 250-254.

Choi, Jung-Woo et. al., "A self-configurable, wireless audio system with user-tracking ability", 2016 AES International conference on sound field control, AES, 60 East 42nd street, room 2520, New York USA, Jul. 14, 2016, XP040680849, pp. 1-5.

Kozintsev, I. et. al., "Position calibration of microphones and loudspeakers in distributed computing platforms", IEEE Transactions on Speech and Audio Processing, Year: 2005 vol. 13 , Issue: 1 pp. 70-83.

Stan, Guy-Bart, et al. "Comparison of different impulse response measurement Techniques" Journal of the Audio Engineering Society 50.4 (2002): 249-262, Apr. 2002.

ICSA 2015 042: "Automatic HOA mixing", Andrey Fedosov, Gregory Pallone, Jerome Daniel, Sylvain, Sep. 18-20, 2015.

Huang, Y. et al "Identification of acoustic MIMO systems: Challenges and opportunities" Signal Processing, vol. 86, Issue 6, Jun. 2006, pp. 1278-1295.

Dokmanic, Ivan, et al. "Euclidean Distance Matrices: Essential theory, algorithms, and applications." Signal Processing Magazine, vol. 32, Issue 6, Oct. 14, 2015, pp. 12-30.

Pollefeys, M. et al "Direct computation of sound and microphone locations from time-difference-of-arrival data." IEEE International Conferencing on Acoustics, Speech and Signal Processing, Mar. 31-Apr. 4, 2008.

Girod, Lewis David, et al "A Self-Calibrating System of Distributed Acoustic Arrays" Dec. 31, 2005, pp. 1-261.

* cited by examiner

AUTOMATIC DISCOVERY AND LOCALIZATION OF SPEAKER LOCATIONS IN SURROUND SOUND SYSTEMS

FIELD OF THE INVENTION

One or more implementations relate generally to surround sound speaker systems, and more specifically to automatically determining speaker locations in a listening environment.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Surround sound speaker systems comprise a number of speakers along with a low-frequency effect (LFE) speaker (subwoofer) that are designed to be placed in designated locations in a room to provide an audio surround effect of 360 degrees sound in the horizontal plane. In most cases, surround sound systems map each source channel to its own speaker. Many different surround sound configurations have been developed with the current standard for most surround sound applications being the 5.1 surround format with 3 front speakers, 2 back speakers and a LFE channel. This is commonly used in cinema, television and consumer applications, and is generally driven by the prescriptive locations required for a traditional multichannel mix.

Relatively strict speaker placement rules are defined for surround systems, such as 60 degrees between the L and R channels with the center speaker directly in front of the listener and surround channels placed 100-120 degrees from the center channel, with any additional surround speakers distributed evenly between 60 and 150 degrees. A 5.1 surround system is generally limited in its ability to convey 180 degree or similar panoramic sound, so more extensive surround formats have been developed. For example, a 7.1 channel surround is commonly used in large cinemas and adds two additional channels to provide additional left/right surround channels or even additional screen channels. Other surround configurations include 9.1, 10.2, 11.1, 22.2, and others.

In both cinema and home environments, a common problem during setup of surround sound systems is the location of speakers in the room. Different room sizes and dimensions may impose constraints in speaker positioning, and the orientation angle of each of the speakers as well as their relative positions is also important. The advent of advanced audio processing systems, such as Dolby® Atmos™ has introduced the possibility of using many different speakers including height speakers for configurations such as 5.1.2 (5 surround, 1 LFE, and 2 height speakers), 7.1.2, 7.1.4, 9.1.2, and so on. With the ability to support up to 24.1.10 channels in cinema and home theater applications, the number of speakers to be positioned and oriented can be quite high. This imposes a significant setup burden for users and can result in non-optimal placement of speakers.

To enhance the usability of newer generation surround sound systems, what is needed is a method to allow a user to easily place speakers in a multi-speaker audio system that allows for relatively arbitrary placement of the speakers, and for the automatic discovery (autodiscovery) of speakers in the system.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. Dolby Atmos, Dolby Digital Plus, Dolby TrueHD, and Dolby Pulse are trademarks of Dolby Laboratories.

For purposes of the present description, the following terms have the associated meanings: the term "channel" means an audio signal plus metadata in which the position is coded as a channel identifier, e.g., left-front or right-top surround; "channel-based audio" is audio formatted for playback through a pre-defined set of speaker zones with associated nominal locations, e.g., 5.1, 7.1, and so on (i.e., a collection of channels as just defined); the term "object" means one or more audio channels with a parametric source description, such as apparent source position (e.g., 3D coordinates), apparent source width, etc.; "object-based audio" means a collection of objects as just defined; and "immersive audio," "spatial audio," or "adaptive audio" means channel-based and object or object-based audio signals plus metadata that renders the audio signals based on the playback environment using an audio stream plus metadata in which the position is coded as a 3D position in space; and "listening environment" means any open, partially enclosed, or fully enclosed area, such as a room that can be used for playback of audio content alone or with video or other content, and can be embodied in a home, cinema, theater, auditorium, studio, game console, and the like. Such an area may have one or more surfaces disposed therein, such as walls or baffles that can directly or diffusely reflect sound waves. The term "driver" means a single electroacoustic transducer that produces sound in response to an electrical audio input signal. The term "speaker" or "loudspeaker" means one or more drivers in a unitary enclosure, and the terms "cabinet" or "housing" mean the unitary enclosure that encloses one or more drivers. The terms "speaker feed" or "speaker feeds" may mean an audio signal sent from an audio renderer to a speaker for sound playback through one or more drivers.

SUMMARY OF EMBODIMENTS

Embodiments are described for a method of performing speaker localization and autodiscovery by determining the Times-of-Arrival (TOAs) for each of the n speakers and m microphones and obtaining defined configuration parameters and a seed (initial) layout of the speakers in the room. The method evaluates multiple candidate TOAs as a method to improve the robustness of the process. These data items are input to a cost function, which is minimized using the TOA values to solve for the positions of the speakers and microphones and the playback latency of each speaker and the recording latency for each microphone. The process uses the minimized cost function output and the configuration parameters and seed layout to generate the estimated location of the speakers and microphones, the estimated latency for each speaker, and an evaluation of the quality of the results. The output layout and latencies are then transformed to canonical format based on the configuration of the system. The residuals of the minimization algorithm provide an estimate of the internal coherence of the original TOA matrix, and this is used to generate an error estimate that allows the system to iterate over the cost minimization process to improve the estimates, as appropriate. Any required post-processing is performed, such as to optimize rendering, provide user alerts and messages regarding speaker/microphone location based on specific applications, such as cinema or home theater use.

Embodiments further include method for localizing speakers in a listening environment having a first number (n) speakers and a second number (m) microphones, by receiving one or more respective times of arrival (TOA) for each speaker of the n speakers to each microphone of the m microphones to generate multiple TOA candidates; receiving configuration parameters of the listening environment; minimizing a cost function using each of the one or more respective TOA values of each speaker to estimate a position and latency of a respective speaker and microphone; iterating the cost function minimization over each TOA candidate of the multiple TOA candidates; and using the configuration parameters and minimized cost function to provide speaker location information to one or more post-processing or audio rendering components.

In other words, embodiments include a method for localizing speakers in a listening environment having a first number (n) speakers and a second number (m) microphones. The method may for example comprise receiving (or obtaining) respective times of arrival (TOA) for each speaker of the n speakers to each microphone of the m microphones, wherein the received (or obtained) TOA include multiple TOA candidates for at least one of the speakers to at least one of the microphones; receiving (or obtaining) configuration parameters of the listening environment; minimizing a cost function using the respective TOA values of each of the speakers and microphones to estimate a position and latency of a respective speaker and microphone; iterating the cost function minimization over each TOA candidate of the multiple TOA candidates; and using the configuration parameters and minimized cost function to provide speaker location information to one or more post-processing or audio rendering components. The received (or obtained) TOA may optionally include multiple TOA candidates for each of the speakers to each of the microphones.

Embodiments are yet further directed to systems and articles of manufacture that perform or embody processing commands that perform or implement the above-described method acts.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Systems and methods are described for an automatic speaker discovery process that locates speakers in a room using multiple times of arrival and latency data, though embodiments are not so limited. Aspects of the one or more embodiments described herein may be implemented in an audio or audio-visual system that plays back source audio information produced in a rendering/encoding system having a decoding/playback system, wherein both the rendering and playback systems include one or more computers or processing devices executing software instructions. Any of the described embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address all of these deficiencies.

Embodiments are directed to a system that automatically locates and calibrates arbitrarily placed speakers in a multispeaker audio system. This autodiscovery system simultaneously localizes a set of speakers and a set of microphones, having only the time of arrival (TOA) between each speaker/microphone pair. It also accounts for variable latency in the speaker and microphone times of arrival. The autodiscovery method works with any practical number of speakers and microphones (such as may be found in high-count surround or Dolby Atmos systems), and uses external inputs to set a global translation (three continuous parameters), a global rotation (three continuous parameters) and discrete symmetries (e.g., an exchange of any axis pairs or reversal of any axis). The microphones may be integrated with or closely linked to the speakers (co-located), or they may be provided and installed as separate units in the room. They can be also temporarily placed for the measurement, such as in a cinema where they may be placed only at the time of a calibration procedure.

System Configuration

Figure 1:
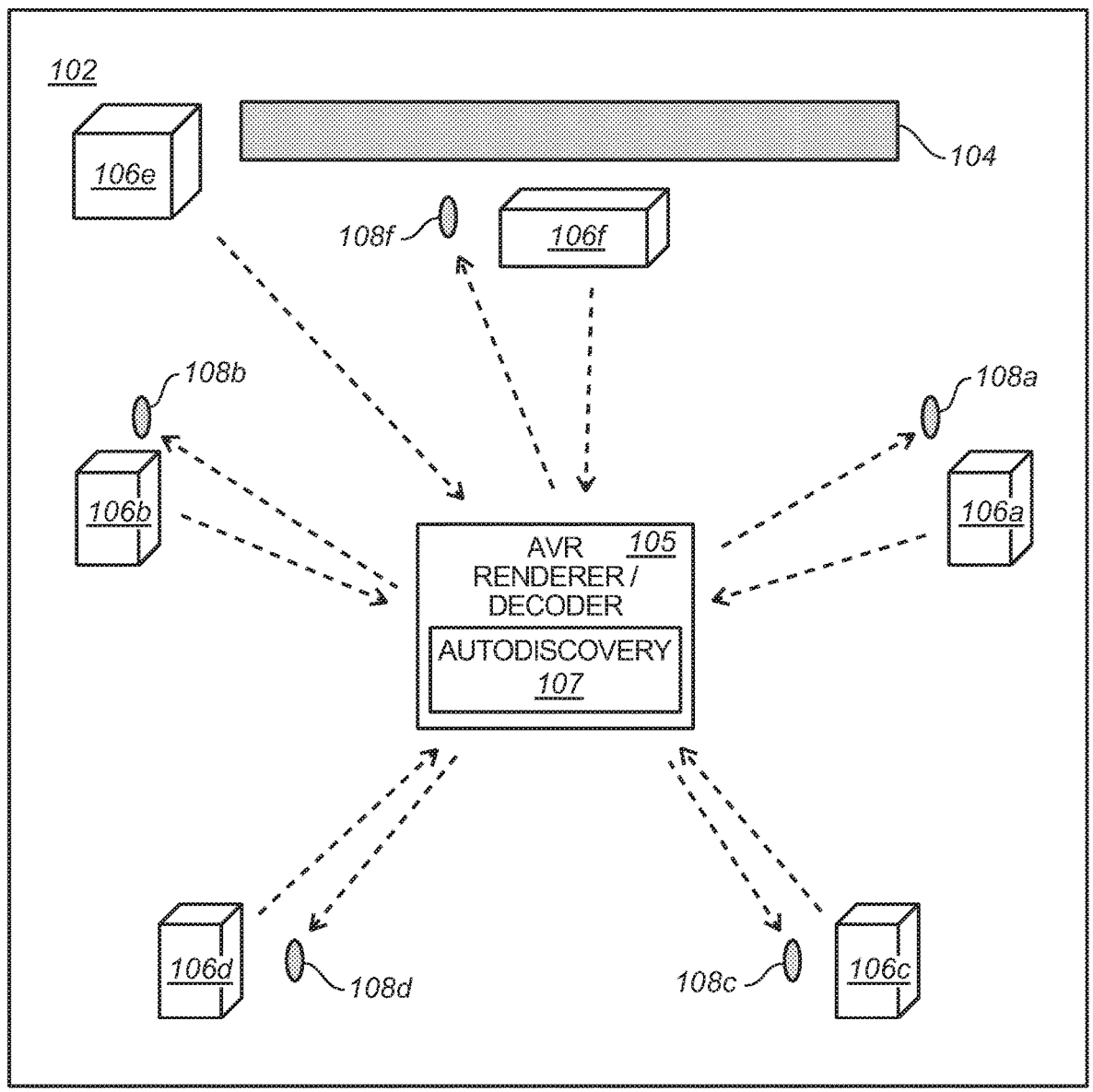
FIG. 1 illustrates a listening environment with a number of speakers used with an audio renderer having an autodiscovery component, under some embodiments.

In an embodiment, the autodiscovery and speaker localization process is implemented as a component or executable process that is part of or closely associated with a renderer component that generates speaker feeds for playback of audio content through an array of speakers. FIG. 1 illustrates a listening environment with a number of speakers used with an audio renderer having an autodiscovery component, under some embodiments. As shown in FIG. 1, a listening environment (room) 102 has a display monitor (e.g., television, projection screen, theatre screen, game console display, etc.) 104 and a number of speakers 106 arranged around the room. An AVR/renderer 105 transmits audio signals in the form of speaker feeds to each of the speakers. Component 105 generally represents an integrated receiver/amplifier unit that is generally referred to as a "renderer." Such a renderer may include or be coupled to a codec that receives audio signals from a source, decodes the signals and transmits them to an amplifier output stage that generates speaker feeds to be transmitted to individual speakers in the room. The audio content may be channel-based surround sound audio or spatial audio content in which the channels are sent directly to their associated speakers or down-mixed to an existing speaker set, and audio objects are rendered by the decoder in a flexible manner Thus, the rendering function may include aspects of audio decoding, and unless stated otherwise, the terms "renderer" and "decoder" may both be used to refer to an immersive audio renderer/decoder 105, such as shown in FIG. 1, and in general, the term "renderer" refers to a component that transmits speaker feeds to the speakers, which may or may not have been decoded upstream.

The listening environment 100 may comprise a movie theatre or similar venue for playback of a movie and associated audio (cinema content) to an audience. These signals are received by a content decoding and rendering component 105, which decodes the encoded cinema content and renders the audio for playback through speakers 106 in the cinema listening environment. The playback stage may include one or more amplifier, buffer, or sound processing components that amplify and process the audio for playback through the speakers. The speakers may comprise single speakers or an array of speakers, such as a surround-sound array or immersive audio speaker array. For a typical playback environment, the decoding and rendering component 105 may be embodied as a playback console or control unit within a control booth or projection room of a cinema, and the listening environment may comprise the theatre or audience seating portion of the cinema. The decoding and rendering component 105 may comprise any number of appropriate sub-components, such as D/A (digital to analog) converters, translators, codecs, interfaces, amplifiers, filters, sound processors, and so on. The listening environment 100 may also represent a home theater environment in which the AVR unit and speaker array are scaled down for use in a typical home or small venue instead of a cinema. Certain components of the AVR unit may also be embodied in small portable, wireless devices (e.g., mobile phone, tablet, game devices, etc.) for use in systems having at least some wireless speakers.

In an embodiment, the audio processed by the system may comprise monophonic (single channel) audio, stereo (two-channel) audio, channel-based audio (surround-sound), object-based audio, or object and channel-based audio (e.g., hybrid or spatial audio) that may be referred to as "immersive audio." In the case of object or immersive audio, the audio comprises or is associated with metadata that dictates how the audio is rendered for playback on specific endpoint devices and listening environments Channel-based audio generally refers to an audio signal plus metadata in which the position is coded as a channel identifier, where the audio is formatted for playback through a pre-defined set of speaker zones with associated nominal surround-sound locations, e.g., 5.1, 7.1, and so on; and object-based means one or more audio channels with a parametric source description, such as apparent source position (e.g., 3D coordinates), apparent source width, etc. The term "immersive audio" may be used to mean channel-based and/or object-based audio signals plus metadata that renders the audio signals based on the playback environment using an audio stream plus metadata in which the position is coded as a 3D position in space. In general, the listening environment may be any open, partially enclosed, or fully enclosed area, such as a room, but embodiments may also include playback through headphones or other close proximity endpoint devices. Audio objects can be considered as groups of sound elements that may be perceived to emanate from a particular physical location or locations in the environment, and such objects can be static or dynamic. The audio objects are controlled by metadata, which among other things, details the position of the sound at a given point in time, and upon playback they are rendered according to the positional metadata. In a hybrid audio system, channel-based content (e.g., 'beds') may be processed in addition to audio objects, where beds are effectively channel-based sub-mixes or stems. These can be delivered for final playback (rendering) and can be created in different channel-based configurations such as 5.1, 7.1, and so on.

In an embodiment, each of the speakers 106 may be embodied in a multi-driver configuration of any appropriate size and configuration, such as floor-standing, bookshelf, satellite format, and so on. The drivers may each be individually addressable and pointing in different directions (e.g., forward, upward, sideward, etc.) for the purposes of reproducing immersive audio. For example, a speaker with both front-firing and upward-firing drivers may be use in immersive audio applications using reflected sound. The speakers 106 may be identical to one another, but are generally of different speaker types depending on location and receive different speaker feeds from the renderer 105 based on their location within the room and orientation.

In general, a "speaker array" is a set of speakers with specific location assignments, such as corresponding to established surround sound placement guidelines. For purposes of description a "set of speakers" refers to speakers placed in a listening environment with no strict location assignments, but that may correspond at least roughly to any appropriate surround sound or immersive audio arrangement. As shown in FIG. 1, for simplicity of illustration, the speakers 106 are arranged in a nominal 5.1 surround sound arrangement so that speakers 106b and 106a are the L/R side channel speakers, 106d and 106c are the L/R surround channel speakers, 106e is the subwoofer (LFE) speaker and 106f is the center channel speaker. It should be noted that the arrangement of speakers 106 in FIG. 1 is intended to be an example, and any other number and arrangement of speakers is also possible, such as a 7.1, 9.1, 9.2 or similar layout. The subwoofer speaker 106e may be embodied as the same type of integrated speaker as the other speakers 106a-d but is typically embodied as a separate dedicated subwoofer speaker.

In an embodiment, the AVR or renderer/decoder 105 of FIG. 1 comprises an audio/video receiver for use in home entertainment environments (home theater, home television, etc.). The AVR generally performs three functions. First, it provides a connection point for multiple source devices, and the AVR is responsible for switching among the inputs. Second, it performs amplification for speakers. Third, it performs audio decoding and processing (e.g., surround sound processing, Dolby Pro Logic™ processing, Dolby Digital™ processing, Dolby TrueHD™ processing, etc.).

The AVR 105 may be coupled to passive speakers through a direct wired connection or to active speakers via a wireless link, in which case each speaker may include an on-board amplifier stage and a wireless receiver. The wireless speakers may connect to the AVR 105 or audio source via a Bluetooth™ connection, a WiFi™ connection, or proprietary connections (e.g., using other radio frequency transmissions), which may (or may not) be based on WiFi standards or other standards. The AVR 105 can also be wired to active speakers so that it does the steps of interconnection and decoding/processing, while the speakers themselves provide the amplification.

The listening environment 102 may represent a large venue, such as an auditorium, cinema or outdoor arena, or it may represent a small venue, such as a conference room or home theater. The number and placement of speakers 106 may thus be dictated by specific instructions that the user or AV installation professional must follow for the proper placement and orientation of the speakers relative the optimum or reference listening position (popularly referred to as a "sweet spot.") For the embodiment of FIG. 1, an autodiscovery component 107 is provided to facilitate relatively random placement of the speakers so that the AVR 105 can generate speaker feeds based on the actual location of the speakers even when they are not placed in accordance with pre-defined locations and configurations. The autodiscovery component 107 includes a speaker localization process that determines the spatial position of each speaker in the room. This position information is then used to help generate appropriate speaker feeds to the individual speakers. It can also be used, through an appropriate user interface (UI) to provide guidance or instructions on speaker placement to a user or provide alerts if one or more speakers not working or initially placed too far from an ideal or viable location. The autodiscovery component 107 may be provided as a component or executable process within the AVR, such as a sub-circuit or sub-program within the rendering function, or as a separate component or process that is functionally coupled to the AVR 105.

As shown in FIG. 1, a number of microphones 108 are used to by the autodiscovery component 107. The microphones may be provided as a separate array of microphones distributed around the room 102, or they may be co-located or placed in close proximity to each speaker or at least a subset of speakers. Thus, for the example configuration shown in FIG. 1, speaker 106a has microphone 108a, speaker 106b has microphone 108b, speaker 106c has microphone 108c, speaker 106d has microphone 108d, and speaker 106f has microphone 108f. Such microphones may be placed or mounted on the speaker cabinet, or may be integrated within the respective speaker. Alternatively, only one microphone or microphone array may be used and placed in an appropriate location, such as the center of room 102 or in the area of the display 104. Thus, the number of microphones may be the same as or different from the number of speakers, and room 102 generally has a first number (m) of speakers and a second number (n) of microphones, where m may or may not equal n. It should be noted that any combination of both microphones on the speakers and a stand-alone array could be used. For example, in one embodiment, microphones are provided on the speakers plus one microphone in the listening position so that it is possible to locate both the speakers and the listening position. The central or listening position microphone can be the microphone on a mobile phone, computer, or tablet for ease of use.

Autodiscovery

In an embodiment, the system of FIG. 1 uses a technique to localize simultaneously a set of speakers and a set of microphones, having only the times of arrival between each of the speakers and microphones. The autodiscovery process 107 uses an external input to set: a global translation (3 continuous parameters), a global rotation (3 continuous parameters), and discrete symmetries, i.e., an exchange of any axis pairs and/or reversal of any axis. Different time of arrival acquisition techniques may be used, such as a prepared signal (e.g., using ultrasonic sweeps, or a prepared trailer) or generic multitrack audio content. The autodiscovery algorithm is based on minimizing a certain cost function, and the process allows for unknown latencies in both the emission and the recordings, possibly linked one to each other.

Figure 2:
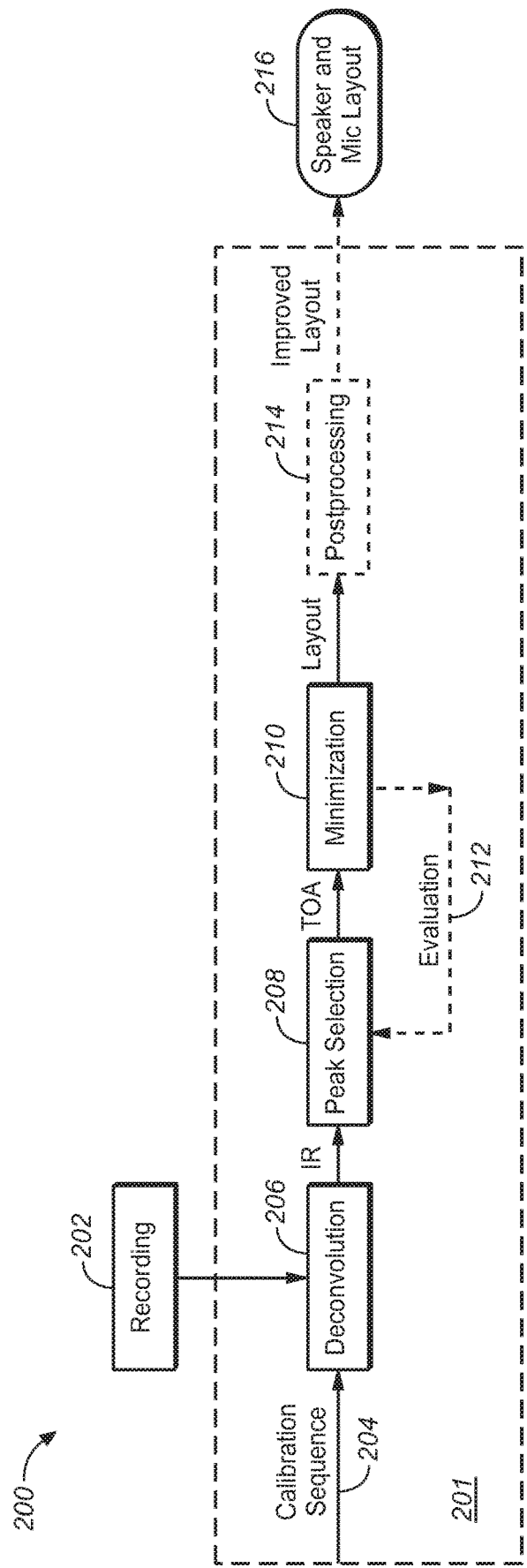
FIG. 2 illustrates the main functional components of an autodiscovery process, under some embodiments.

FIG. 2 illustrates the main functional components of an autodiscovery process, under some embodiments. As shown in diagram 200, the autodiscovery process may be broken into five main components, with certain optional features indicated by dashed lines. These include the deconvolution 206 of a calibration audio sequence 204 provided and a recording 202 (or streaming audio), a peak selection process 208, a cost-function minimization process 210, an evaluation process 212, and an optional post-processing operation 214. Main subprocesses and functional components for each process 206 to 214 will be provided in further detail below.

It should be noted that the terms "deconvolution" or "deconvolving" as used herein is not necessarily meant to be deconvolution in strict mathematical terms, but rather any process that leads to the computation of an Impulse Response or a pseudo-Impulse Response (IR) from which it is possible to extract the Times of Arrivals (TOAs). In general, deconvolution comprises any process that goes from the recorded sound to the impulse responses (from which the TOAs can be extracted), but does not include an iterative peak-searching algorithm. It should be noted that there are circumstances where the process of "deconvolution" might produce something that is different to a real IR, thus producing what is referred to as a "pseudo-IR." Thus, the term pseudo-IR can mean any processed form of the input audio that allows a straightforward extraction of a set of candidate peaks or TOAs.

The end product of the deconvolution process 206 is the set of TOAs for the autodiscovery algorithm. Having a multichannel audio system composed by multiple (n) speakers and multiple (m) microphones, the goal is to recover an n-by-m TOA matrix corresponding to the propagation from each one of the n speakers to each one of the m microphones. Estimating an IR can be accomplished by cross-correlating a known reference audio sequence to a recording of this sequence obtained from the microphones in the system, obtaining a pseudo-impulse response. Another estimation method is to obtain the impulse responses by deconvolving a recorded calibration audio sequence 204 and the recorded audio 202, as shown in FIG. 2. From the IR or pseudo-IR, a peak-searching algorithm estimates the best TOA candidates in an iterative manner, as necessary. For the peak-searching algorithm various different techniques can be used, such as variable threshold for peak-searching based on SNR (signal-to-noise ratio), peak grouping, and so on, Several techniques can be used for deconvolving the calibration audio sequence 204 to obtain a room impulse response. One method is to use a room calibration audio sequence, like a sweep (logarithmic sine tone) or a MLS sequence, emitted sequentially by each of the n speakers and recorded simultaneously by the m microphones. Such methods are standard, well tested, and exhibit good signal-to-noise ratio; however, these signals used for calibration are not pleasant for the listener. Alternatively, a calibration audio sequence, like a sweep (logarithmic sine tone) or a MLS sequence, but band-limited to the close ultrasonic range (18 to 24 kHz) can be used. In this audio range most standard audio equipment is able to emit and record sound but such a signal cannot be perceived because it lies beyond the normal human hearing capabilities. Therefore the calibration sequences emitted are inaudible and thus completely transparent for the listener. However, the impulse responses obtained this way can only be used for localization and not for equalization given that they are limited to the ultrasonic frequency range.

Another method for obtaining the TOAs is to use an arbitrary multichannel audio sequence. By knowing the emitted audio and the corresponding received audio, it is possible to recover the room impulse response from a generic multichannel audio sequence. A drawback of this technique, however, is the simultaneous playback and channel correlations. Simultaneous playback in multiple channels creates major interferences among the different channels, aggravated by the fact that channels are not usually decorrelated. Another disadvantage is in empty or very low level channels. Surround channels usually emit at a much lower level than screen channels and determining the impulse response for these channels may be very difficult or impossible. The source material in general will not be full bandwidth, thus making the calculation of a full-band IR practically impossible.

A further alternative method involves using a specially designed or specifically defined multichannel audio sequence, which is appealing to the listener and at the same time avoids the problems mentioned above by having multiple fragments in which each one of the speakers emits sound individually, the sound is emitted at the same or comparable level, and the sound corresponds to a full-bandwidth or quasi-full bandwidth sound. This special multichannel audio sequence can be specifically designed for the system or automatically generated.

Once deconvolution 206 is performed, a peak selection process 208 selects multiple TOA candidates. The use of multiple candidate TOA solutions adds robustness over systems that utilize single or minimal TOA values, and ensures that errors have a minimal impact on finding the optimal speaker layout. Having obtained an IR of the system, as provided by deconvolution 206, each one of the TOA matrix elements can be recovered by searching for the peak corresponding to the direct sound. In ideal conditions (i.e., no noise, no obstructions in the direct path between source and receiver and speakers pointing directly to the microphones) this peak can be easily identified as the largest peak in the impulse response. However, in presence of noise, obstructions, or misalignment of speakers and microphones, the peak corresponding to the direct sound does not necessarily correspond to the largest value and it can actually be difficult to isolate from other reflections and/or noise. The direct sound identification is a delicate process, and a wrong identification of the direct sound may completely spoil the complete autodiscovery process. Thus, in cases where there is room for confusion it is effective to consider multiple candidates for the direct sound. The peak selection process 208 consists of two parts: (1) a direct sound search algorithm, which looks for suitable peak candidates, and (2) a peak candidate evaluation process 212 to increase the probability to pick the correct TOA matrix elements.

With respect to the process of searching for direct sound candidate peaks, process 208 includes a method to identify relevant candidates for the direct sound based on the following five steps: (1) identify one first reference peak (e.g. the maximum of the absolute value of the IR), the "first peak;" (2) evaluate the level of noise around (before and after) this first peak; (3) search for alternative peaks before (and in some cases after) the first peak that are above the noise level; (4) rank the peaks found according to their probability of corresponding the correct TOA; and (5) possibly group close peaks (to reduce the number of candidates).

Once direct sound candidate peaks are identified, the process performs a multiple peak evaluation step 112. As a result of the direct sound candidate peak search, for each TOA matrix element there will be one or more candidate values ranked according their estimated probability. Multiple TOA matrices can be formed by selecting among the different candidate values. In order to assess the likelihood of a given TOA matrix, the minimization process (described in greater detail below) is executed. This process generates the residuals of the minimization, which are a good estimate of the internal coherence of the TOA matrix. A perfect noiseless TOA matrix will lead to zero residuals, whereas a TOA matrix with wrong matrix elements will lead to large residuals. In practice, the method will look for the set of candidate TOA matrix elements that creates the TOA matrix with smaller residual. In an embodiment, the evaluation process 212 performs the following steps: (1) choose an initial TOA matrix; (2) evaluate the initial matrix with the residuals of the minimization process; (3) change one matrix element of the TOA matrix from the list of TOA candidates; (4) re-evaluate the matrix with the residuals of the minimization process; (5) if the residuals are smaller accept the change, otherwise do not accept it; and (6) iterate over steps 3 to 5.

The autodiscovery process, described above with reference to FIG. 2, may for example be regarded as a method for localizing speakers in a listening environment having a first number (n) speakers and a second number (m) microphones. The method may comprise obtaining (or receiving) respective times of arrival (TOA) for each speaker of the n speakers to each microphone of the m microphones. The obtained (or received) TOA may include multiple TOA candidates for at least one of the speakers to at least one of the microphones. In other words, rather than obtaining (or receiving) a single TOA for a speaker to a microphone, multiple TOA candidates may be obtained for the speaker to the microphone. The one or more TOA obtained (or received) for a speaker to a microphone may for example be referred to as TOA values or TOA candidates. The method may comprise obtaining (or receiving) configuration parameters of the listening environment. The method may comprise minimizing a cost function using the respective TOA values of each of the speakers and microphones to estimate a position and latency of a respective speaker and microphone. The method may comprise iterating the cost function minimization over each TOA candidate of the multiple TOA candidates. The method may comprise using the configuration parameters and minimized cost function to provide speaker location information to one or more post-processing or audio rendering components.

As described above, the TAO candidates may for example be obtained via deconvolution 206 and peak selection 208. However, rather than using such a specific example implementation, the method for localizing speakers may in general comprise estimating an impulse response (IR) of the listening environment based on a reference audio sequence played back by one or more of the speakers and a recording of the reference audio sequence obtained from one or more of the microphones, and using the IR to search for direct sound candidate peaks, wherein the multiple TOA candidates correspond to respective candidate peaks identified in the search. In other words, the TOA candidates may be obtained by searching for those peaks in the IR which could potentially be direct sound peaks. As described above with reference to FIG. 2, the search for direct sound candidate peaks (or the peak selection 208) may for example include evaluating a reference peak and using noise levels around the reference peak. The search for direct sound candidate peaks may for example include evaluating a reference peak and searching for alternative peaks around the reference peak (or searching for alternative peaks at least in a portion of the IR located before and/or after the reference peak) using noise levels around the reference peak. The obtained TOA may for example include multiple TOA candidates for each of the speakers to each of the microphones.

The speaker location information provided by the method to one or more post-processing or audio rendering components may for example be based on a selection among the TOA candidates for which a residual of the minimizing step is below a certain threshold value. The TOA candidates may for example be selected such that cost function minimization yields as low residual values as possible.

The method for localizing speakers in a listening environment may for example comprise estimating an impulse response (IR) of the listening environment by one of: cross-correlating a known reference audio sequence to a recording of the sequence obtained from the microphones to derive a pseudo-impulse response, or deconvolving a calibration audio sequence and a recording of the calibration audio sequence obtained from the microphones. The method may for example comprise using the IR to search for direct sound candidate peaks by evaluating a reference peak and using noise levels around the reference peak, wherein the TOA candidates correspond to candidate peaks identified in the search; and performing a multiple peak evaluation by selecting an initial TOA matrix, evaluating the initial matrix with residuals of the minimizing step, and changing TOA matrix elements until the residuals are below a defined threshold value.

The step of obtaining (or receiving) the TOA values for each of the speakers and each of the microphones may for example comprise deconvolving a calibration audio sequence sent to each speaker to obtain a room impulse response (IR); and using the IR to search for direct sound candidate peaks by evaluating a reference peak and using noise levels around the reference peak. A multiple peak evaluation may for example be performed by selecting an initial TOA matrix, evaluating the initial matrix with residuals of the minimizing step, and changing TOA matrix elements until the residuals are below a defined threshold value.

Cost Function Minimization

A main function of system 200 is the process of cost function and constrained minimization 210. This is a unique approach that is taken towards the minimization of the cost functions and applied constraints, and includes the addition of unknown latencies to be estimated by the minimization algorithm.

Figure 3:
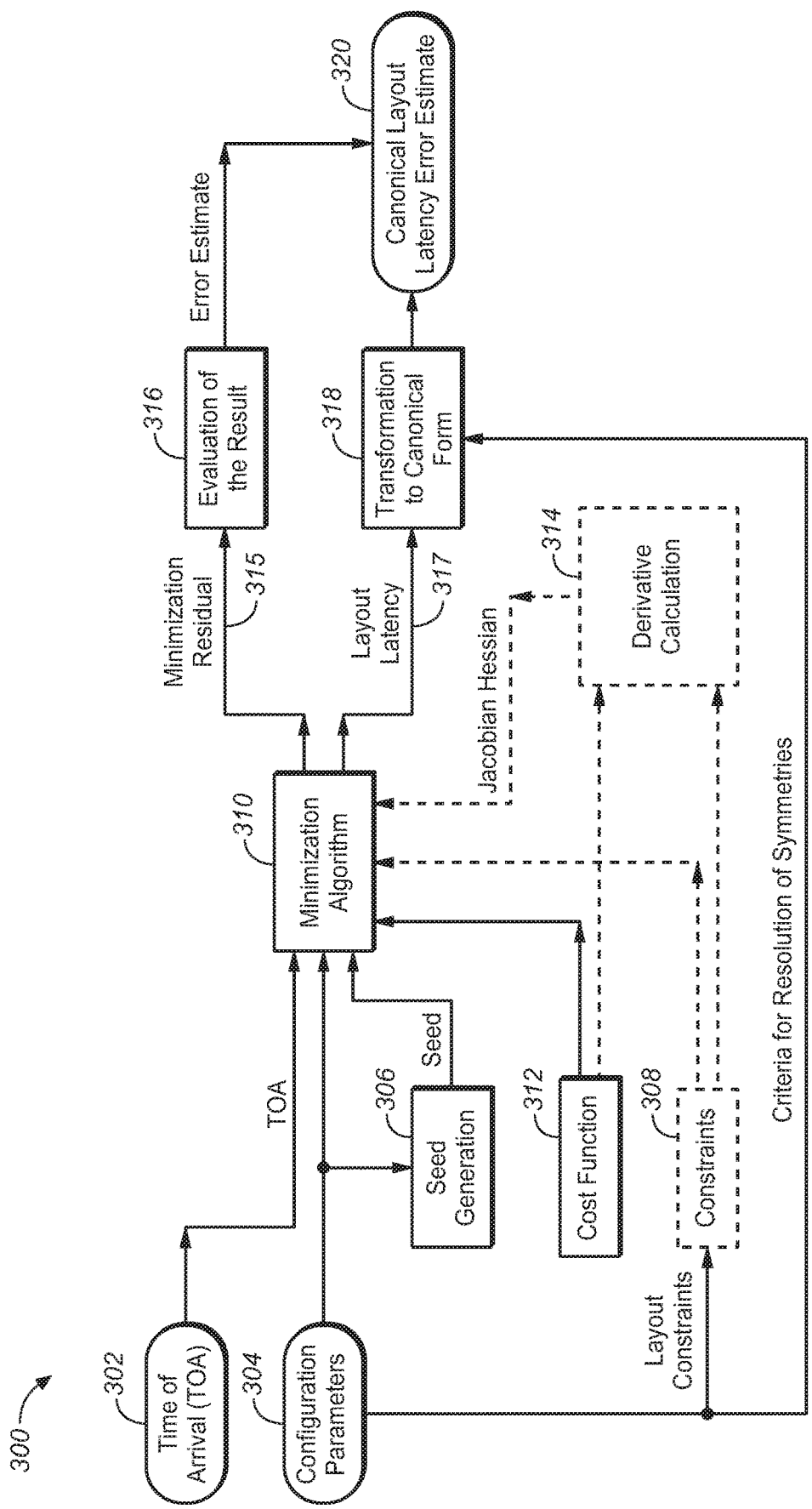
FIG. 3 illustrates a system for performing cost function minimization in an autodiscovery process, under some embodiments.

FIG. 3 illustrates a system for performing cost function minimization in an autodiscovery process, under some embodiments. Having n speakers and m microphones, the minimization algorithm 310 receives as input data the TOA values 302 from each of the speakers to each of the microphones, along with any configuration parameters 304 specified for the listening environment, speakers, microphones, and other environmental characteristics. Configuration parameters may be defined for maximum room dimensions, 2D or 3D configurations, speaker layout constraints, speaker/microphone correlation, and other like characteristics. The minimization algorithm 310 for the cost function 312 returns as outputs the estimated location 320 of the speakers and microphones, the estimated latency 317 for each speaker and microphone, and an evaluation of the quality of the results 316.

In an embodiment, the minimization algorithm 310 works by minimizing the cost function 312 which takes into account the difference of the measured times of arrival and the estimated times of arrival from the speaker and microphone positions. This cost function is fed into the minimization algorithm 310, along with some other possible constraints 308 that the layout must obey (e.g., some of the microphones and speakers are in the same location).

In an embodiment, the minimization algorithm 310 uses an interior optimization method (IPOPT), which needs the Jacobian and Hessian of the cost function and possible constraints as provided by a derivative calculation 314 performed on the cost function 312 output and constraints 308. With respect to the derivative calculation 314, for many optimization techniques, such as IPOPT, it is advantageous if the explicit first derivatives (Jacobian) and second derivatives (Hessian) of the cost function and constraints with respect to the unknowns are explicitly provided. However, this is not always strictly needed, since derivatives can be also computed numerically or using automatic differentiation techniques. In the case where other optimization techniques are used, such techniques may not rely on derivatives.

The minimization algorithm 310 also requires as input a seed layout which is generated 306 from the configuration parameters 304. The seed layout defines initial speaker placements and may be defined in reference to a standard, such as a surround-sound convention and should include an accurate speaker count. The residuals of the minimization 315 provide an estimation of the quality of the results, and can be used to assess the likelihood of the time of arrival set as processed in an evaluation function 316.

In an embodiment, the minimization algorithm 310 is a nonlinear algorithm that solves the following problem:

minimize $C(x), x \in R^n$ subject to: $x^L \leq x \leq x^U, ga^L \leq ga(x) \leq ga^{(U)}, \alpha=1, \ldots, m$ where $C(x): R^n \rightarrow R$ is the so called cost-function, $x \in R^n$ is a variable representing the point in the multidimensional space of parameters, $x^L$ and $x^U$ are the bounds on the space of parameters, $ga(x)$ are the constraints and $ga^L$ and $ga^U$ are the bounds of the constraints.

In an embodiment, the minimization algorithm may use an interior point optimization (IPOPT) program that comprises a software library for large-scale nonlinear optimization. IPOPT implements a primal-dual interior-point filter line-search algorithm. Alternatively, any similar optimization library that can process problems of the form given above may also be used. These include a gradient descent optimization method.

In an embodiment, the cost function is formulated for a system having n speakers and m microphones, and uses the following data: TOA from speaker i (i=1 . . . n) to a microphone j (j=1 ... m); $TOA_{ij}$ to solve for the following unknowns:

a. Position of each one of the speakers s, i=1 ... n (3 coordinates per speaker)

b. Position of each one of the microphones $m_j$, j=1 ... m (3 coordinates per mic)

c. Playback latency for each speaker $l_i$, i=1 n (1 value per speaker)

d. Recording latency for each microphone $k_1$, j=1 ... m (1 value per mic)

The following cost function can be formulated:

$$C(\vec{s}_i, \vec{m}_j, l_i, k_j) = \sum_{i=1}^{n} \sum_{j=1}^{m} [\|\vec{s}_i - \vec{m}_j\| - c(TOA_{ij} - l_i + k_j)]^2,$$

where c is the speed of sound. Each one of the variables can be bounded between a maximum and a minimum value, e.g., bounded to be inside the room size.

Some of the cost function unknowns can be linked to one another in several ways through an (optional) constraint function 308. For example, speakers and microphones can be constrained to be collocated or integrated, or separated by a defined maximum distance; the recording and playback latencies can be constrained to be identical, such as for wireless speakers; and a given set of microphones (and/or speakers) can be constrained to lie on a given line, such as for cinema environments. The constraints can always be formulated in the following form:

$$ga^L \leq g_\alpha(s_i, m_j, l_i, k_j) \leq ga^{(U)}$$

if $ga^L = ga^{(U)}$, the constraints are called equality constraints, otherwise they are called inequality constraints. For example, if the recording and playback latencies for a particular speaker (speaker 1) are identical, a given constraint could be: $g_1 = l_1 - k_1 = 0$. The autodiscovery process can accept a different number of predefined constraints, depending on the initial configuration parameters 304, and as mentioned above, the constraints are optional and need not always be present or factored into the minimization algorithm 310.

As shown in FIG. 3, the configuration parameters are also input into a seed generation function 306. The seed is an initial point for the minimization algorithm to start searching for the localization process. A seed must contain: (1) the correct number of speakers and microphones in reasonably defined initial positions (e.g., five speakers could initially be in the canonical 5.1 surround positions); and (2) initial values for the latencies (e.g., an initial small value is usually enough). The seed should verify any existing constraint; for example, if microphones must be attached to speakers, the initial seed should also comply with this requirement. The seed is created during execution time depending on the initial configuration parameters 304, and the final results 320 should not depend on the initial seed provided.

Other cost function minimization techniques can also be used, such as certain mathematical methods that implicitly involve minimizing a certain cost function. Examples of such methods include algebraic techniques of the pseudo-inverse and MDS (multidimensional scaling). In general, the term "cost function minimization" may include these mathematical methods as well as the algorithmic minimization methods described above.

Figure 4:
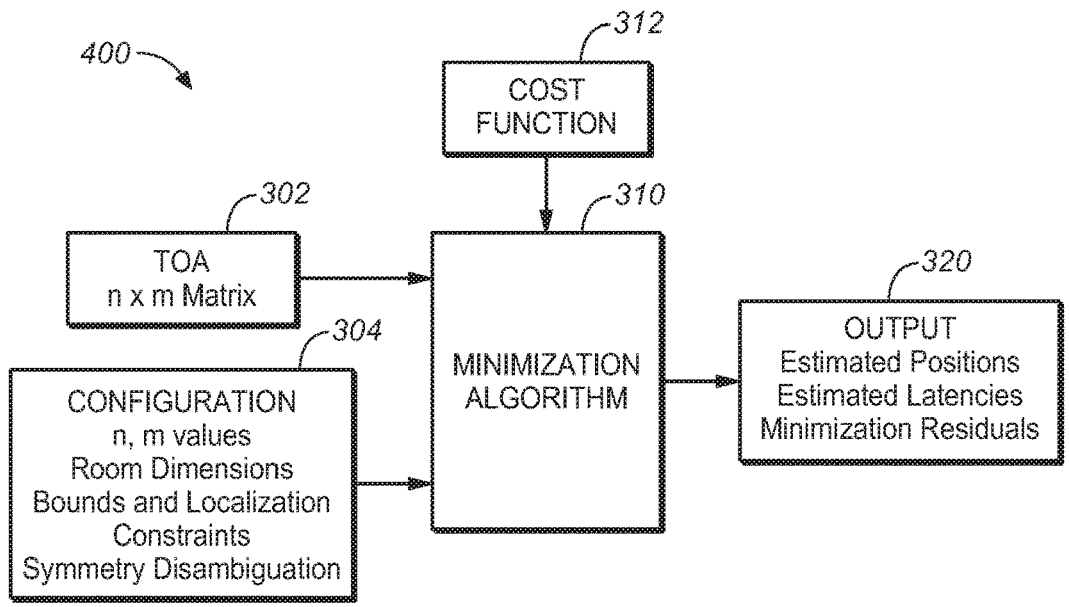
FIG. 4 is a simplified diagram illustrating the input and output parameters for the minimization algorithm for the embodiment of FIG. 3.

FIG. 4 is a simplified diagram illustrating the input and output parameters for the minimization algorithm for the embodiment of FIG. 3. As shown if FIG. 4, the inputs to the minimization algorithm 310 comprise the TOA values 302 for the n speakers and m microphones as an n by m matrix, and the configuration parameters 304. In an embodiment, the configuration parameters include the number of speakers and microphones (n and m), the room size (in meters or other dimension), bounds on the maximum recording and playback latencies, a specification of whether the localization should be two-dimensional (e.g., simple surround) or three-dimensional (e.g., immersive audio), constraints on the positions of the speakers and/or microphones (e.g., co-located speakers/mics, central mic array, etc.), and references to disambiguate rotation, translation and axes inversion symmetries. Other configuration parameters may also be used, as necessary and appropriate. The minimization algorithm 310 uses the TOA and configuration parameters to minimize the cost function 312 to produce a set of outputs 320, which include the estimated positions of the speakers and microphones, the estimated playback and recording latencies, and the minimization residuals (i.e., the value of the cost function after minimization). Other output values may also be provided, depending on the cost function and configuration parameters used processed by algorithm 310.

With respect to symmetry disambiguation (in parameters 304), in general, the cost function 312 is invariant under Euclidean transformations E(3), including global spatial translations, global spatial rotations, and axis inversion symmetries. In addition, latencies have one additional translation T(1) symmetry, corresponding to the fact that adding equal latencies simultaneously to all microphones and loudspeakers leads to indistinguishable results. All different layouts related by any symmetry transformation are totally indistinguishable in this framework, and are defined to belong to the same equivalence class. It is important to choose a criterion allowing to uniquely define a canonical layout representing an entire equivalence class. Although not strictly necessary, it is convenient if this canonical layout defines a reference frame that is close to the reference frame of a listener near the reference listening position.

The process uses global translations T(3) (3 continuous parameters), global rotations SO(3) (3 continuous parameters), and axis inversion symmetries (x→-x/y→-y/z→-z) (3 discrete parameters, only 1 independent). The latency translation symmetry is T(1) (1 parameter) (l_m→l_m+L, k_m→+L). All different layouts related by the one of the transformations above are said to be under the same equivalence class. It is convenient to choose a criterion allowing to disambiguate the symmetries: namely, to uniquely define a canonical layout representing an entire equivalence class of layouts related by symmetries. Although not necessary from the mathematical point of view, in practice it is convenient if this canonical layout defines a reference frame that is close to the reference frame of a listener near the reference listening position, as mentioned above.

The implementation is completely generic, and to determine the canonical layout the process uses certain inputs. To disambiguate global translations, the system may use a center reference to establish the position of the center of coordinates (example 1: position of microphone n. 1, which could be a smartphone in the reference listening position; example 2: mean position of all speakers). To disambiguate global rotations, the process may use a floor reference to determine the orientation of the floor (example 1: the "mean" plane defined by the floor speakers; example 2: the mean plane defined by all ceiling speakers). It may also use a frontal reference to determine the position of the front, where the screen is usually located (example 1: the position of the C (center-channel) speaker; example 2: the position of the TV speaker).

To disambiguate axis inversion symmetries the process may use the left-right reference, to disambiguate the left-right symmetry (example 1: position of the L speaker minus R speaker; example 2: external input provided by the user); and the up-down reference to disambiguate the up-down symmetry (example 1: position of a ceiling speaker minus the position of the speaker on the plane; example 2: external input provided by the user).

To disambiguate the latency, the process may use a latency reference to decide which part of the latency is recording latency and which part is the playback latency. As a first example, the average recording latency could be set to some fixed quantity. As a second example, the recording latency of microphone n.1 could be set to some constant value.

The layout 320 determined by the minimization algorithm 310 can have any arbitrary orientation. The layout is brought to canonical form by applying rotations and translations according to the references mentioned above.

As shown in FIG. 3, the minimization algorithm 310 produces a minimization residual that is used by a function 316 that evaluates the result to generate an error estimate that is used in the final output 320. For the algorithm 310 to work, the number of data must be greater than the number of parameters to estimate. It is useful to introduce the number of degrees of freedom $N_{def}$, which may be defined as follows:

$$N_{def} = N_{data} - (N_{unknown} - N_{constraints} - N_{symmetries})$$

where, for n speakers and m microphones, $N_{data}$=nm is the number of elements of the TOA matrix, $N_{unknowns}$=4n+4m is the number of unknowns (3 coordinates per speaker or microphone plus latencies), $N_{constraints}$ is the number of constraints, and $N_{symmetries}$=7, which is the number of continuous symmetries (where values quoted are valid in 3D). If $N_{def}$<0, the problem cannot be solved. If $N_{def}$=0, the problem is solvable in principle. If $N_{def}$>=1 there is some redundancy in the solution.

When the number of degrees of freedom is at least 1, there is some redundancy in the solution that can be exploited, such as to increase the robustness of the estimation and/or to estimate the quality of the minimization. For the error estimate, provided that $N_{def}$≥1, a distance error estimate of the minimization $d_{error-estimate}$ can be computed as SQRT($C/N_{def}$), where C is the minimization residual, which is the value of the cost function at the minimum point.

Figure 5:
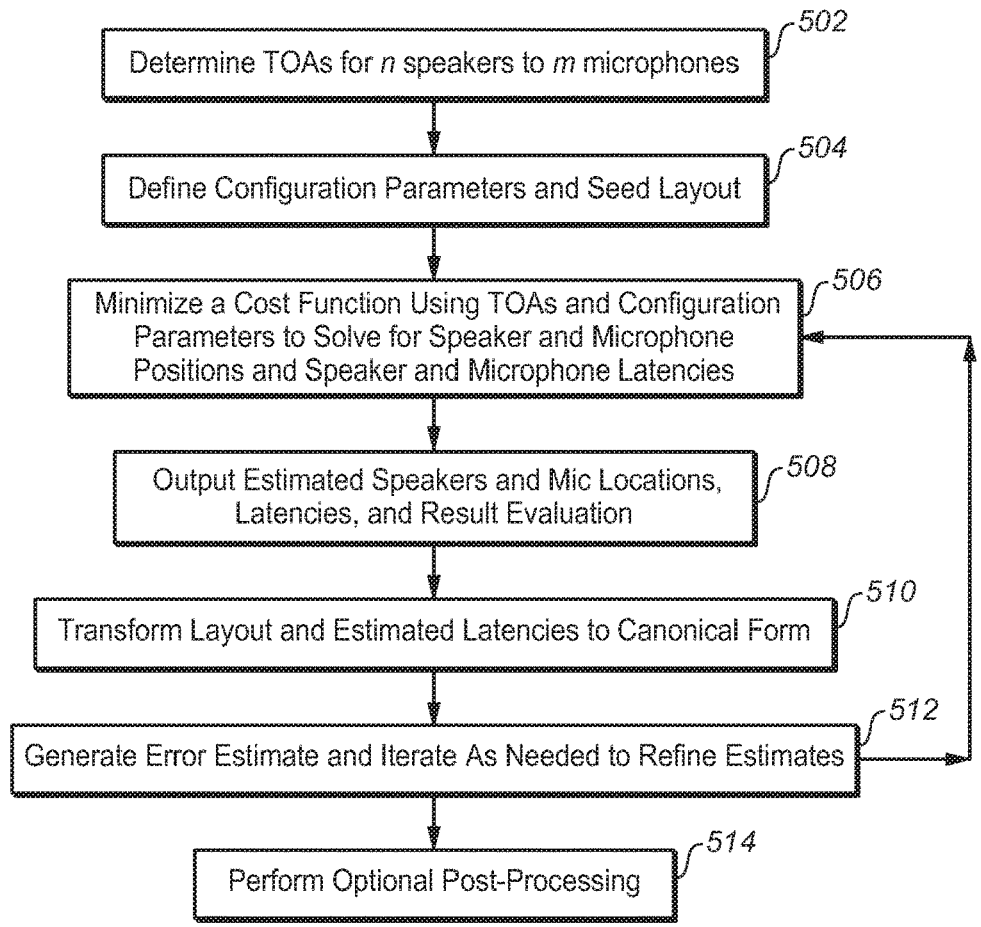
FIG. 5 is a flowchart that illustrates a method of performing speaker localization and autodiscovery, under some embodiments.

FIG. 5 is a flowchart that generally illustrates a method of performing speaker localization and autodiscovery, under some embodiments. In step 502 the system determines the times-of-arrival for each of the n speakers and m microphones. It also obtains the defined configuration parameters and seed layout, step 504. These data items are input to a cost function which is minimized using the TOA values to solve for the positions of the speakers and microphones and the playback latency of each speaker and the recording latency for each microphone, step 506. In step 508, the process uses the minimized cost function output and the configuration parameters and seed layout to generate the estimated location of the speakers and microphones, the estimated latency for each speaker, and an evaluation of the quality of the results. The output layout and latencies are then transformed to canonical format based on the configuration of the system, step 510. The residuals of the minimization algorithm provide an estimate of the internal coherence of the original TOA matrix, and this is used to generate an error estimate that allows the system to iterate over the cost minimization process to improve the estimates, as appropriate, step 512. Another iterative process involves evaluating alternative candidate TOAs. Thus, as shown in FIG. 5, after step 512, the process proceeds back to step 506 to evaluate other alternative candidate TOAs. Once the TOAs and all alternative candidate TOAs have been evaluated, the process performs any required post-processing, such as to optimize rendering, provide user alerts and messages regarding speaker/microphone location based on specific applications, such as cinema or home theater use, step 514.

Cinema Post-Processing

With reference to FIG. 2 and FIG. 5 step 512, once the minimization algorithm has been executed and the layout determined, one or more optional post-processing steps 214 can be performed. Specific post-processing functions may vary depending on whether the autodiscovery process is used in a cinema (professional) environment or a home (consumer) environment.

Figure 6:
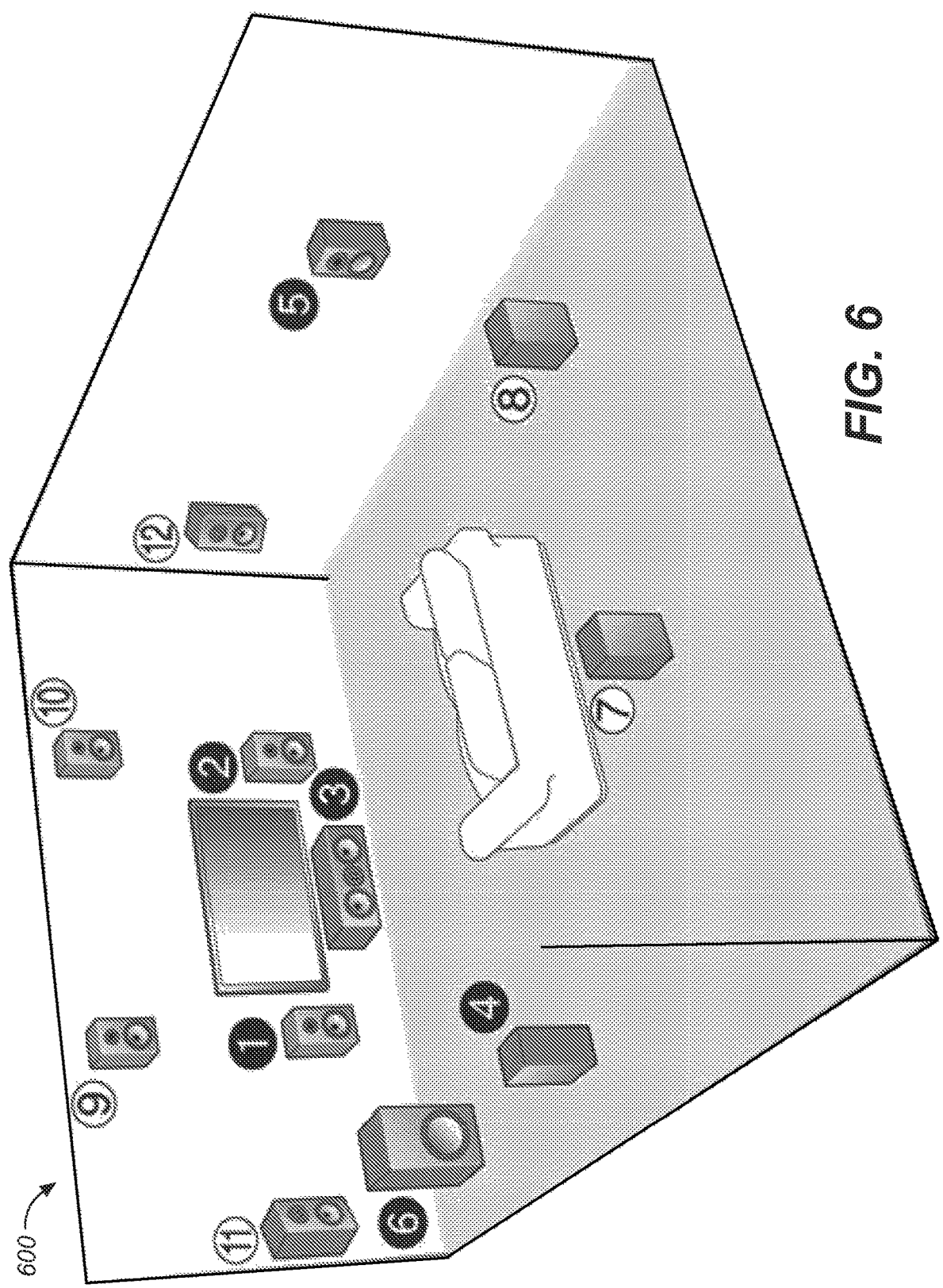
FIG. 6 illustrates the speaker placement in an example immersive audio system that provides height speakers for playback of height channels.

For cinema applications, one particular use case is a Dolby Atmos system, which represents an immersive audio system and associated audio format. Such a system incorporates a height (up/down) dimension that may be implemented as a 9.1.x surround system, or similar surround sound configuration. FIG. 6 illustrates the speaker placement in a simplified example Dolby Atmos system that provides height speakers for playback of height channels. Such a system may represent a home theatre system and can be expanded through the use of additional speakers for auditorium and cinema use. The speaker configuration of the 9.1 system 600 is composed of a number of speakers numbered 1 to 12 located in the floor and height planes as well as close to the screen. In an Atmos system, the height speakers (e.g., speakers 9 and 10 are usually placed one-quarter of the way into the room inside from the wall, though many variations of height and wall position are possible. In some installations actual ceiling speakers that project downward may also be provided, and alternatively speakers may have upward firing drivers to reflect sound off of the ceiling down into the room. In general, the speakers may be used to produce sound that is designed to emanate from any position more or less accurately within the room.

Predefined speaker configurations, such as those shown in FIG. 6, can naturally limit the ability to accurately represent the position of a given sound source. For example, a sound source cannot be panned further left than the left speaker itself. This applies to every speaker, therefore forming a one-dimensional (e.g., left-right), two-dimensional (e.g., front-back), or three-dimensional (e.g., left-right, front-back, up-down) geometric shape, in which the rendering is constrained. Various different speaker configurations and types may be used in such a speaker layout. For example, certain enhanced audio systems may use speakers in a 9.1, 11.1, 13.1, 19.4, or other configuration. The speaker types may include full range direct speakers, speaker arrays, surround speakers, subwoofers, tweeters, and other types of speakers. As stated above, the same or different system filters may be applied to different speakers or sets of speakers within a channel/object-based surround sound system, such as system 600 of FIG. 6.

In a full Atmos cinema system, the layout is formed by 30-60 independent speakers forming six different arrays: two ceiling, two side-surround, and two rear-surround, plus screen, though other configurations are also possible. In order to calibrate the system an array of about eight microphones is used, placed in an area around the reference listening position, though other microphone numbers/configurations are also possible. In the traditional procedure, the installer manually indicates the physical location of every speaker in a dedicated software program and assigns the correct channel routing to it. With such a large number of speakers, the procedure is time consuming and prone to errors. The impulse responses from each of the speakers to each one of the microphones are measured later on in the process, using the sine sweep method, to be used for cinema equalization. Due to the asynchronous emission and reception process, these impulse responses have unknown latencies. The autodiscovery process 200 allows the system to use the impulse response measurements not only for equalization but also for localization. With autodiscovery the procedure is streamlined, since the installer only needs to indicate the number of speaker in each array, and some additional references to allow autodiscovery resolve the symmetries (e.g., the routing for the L, C, and R channels). From this information, and from the set of impulse responses, the autodiscovery process is able to automatically, first, localize each one of the speakers in the room, correcting for any variable latencies; second, determine the correct routing for each speaker; third, assign each speaker to a given array; fourth, align and pair the speakers into a regular Atmos layout, and, finally, generate a Dolby Atmos configuration file which is used by the renderer. Although the process can be totally automatic, the user has the opportunity to review the results of the localization and revert to manual mode if he or she wishes.

Figure 7:
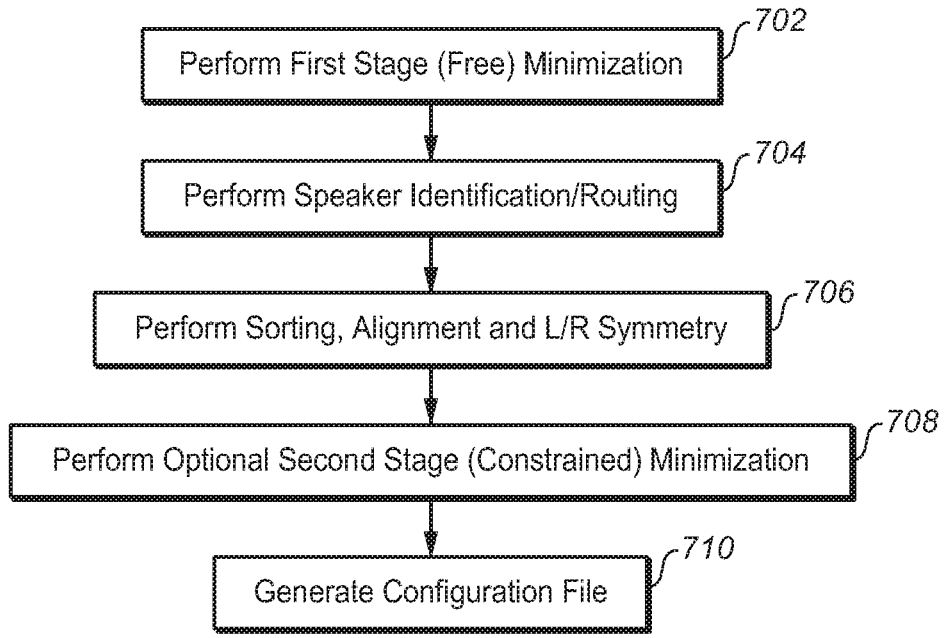
FIG. 7 is a flowchart that illustrates a method of performing speaker localization in an immersive audio system under some embodiments.

With respect to post-processing 214 for cinema, as stated above, in an Atmos cinema there are typically many speakers (e.g., up to 60 speakers) to be localized, and they belong to different speaker arrays: screen, left and right surrounds, back surrounds, and left and right ceiling. However, the localization process itself may not label or identify the speakers as part of the output 320. It is thus convenient to provide an additional post-processing step that identifies the speakers, and properly aligns them into the different arrays as needed. FIG. 7 is a flowchart that illustrates a method of performing speaker localization in an immersive audio (e.g., Dolby Atmos) system under some embodiments. For the embodiment of FIG. 7, the process starts with a first stage minimization step (free or unconstrained minimization) 702 in which the cost function is minimized as described above with reference to FIG. 3. In step 704, speaker identification (routing) is performed, in which, from the localization information, speakers are identified and assigned to different arrays (e.g., screen, L/R surrounds, back surround, L/R ceiling, etc.). In step 706, sorting, alignment and left/right symmetry is performed, in which the speakers are sorted according to the identification above. The different arrays are aligned and left-right symmetry is enforced by pairing each left speaker to its right counterpart. In step 708, an optional second-stage minimization (constrained minimization) can be performed. In this step, the position of the speakers is refined by running a second minimization operation where the location of speakers is constrained to be aligned to its corresponding array. The process then generates an (Atmos) configuration file from the results, step 710.

Figure 8:
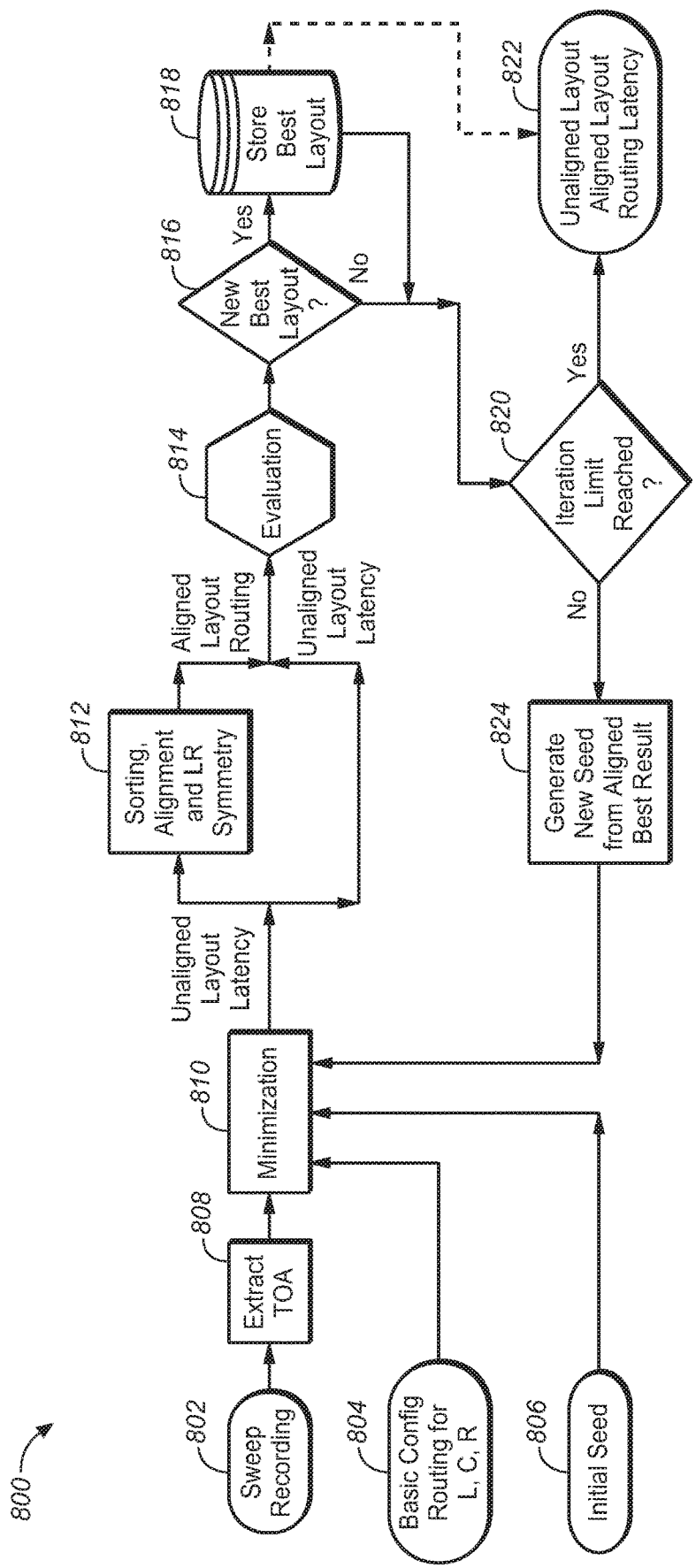
FIG. 8 illustrates a system for performing speaker autodiscovery and localization in an immersive audio application, under some embodiments.

FIG. 8 illustrates a system for performing speaker autodiscovery and localization in an immersive audio application, under some embodiments. As shown in diagram 800 a sweep recording 802 is used to extract TOA values, 808. The TOA values and basic configuration routing for the left, center, and right channels 804 and an initial seed 806 are input to the minimization process 810. The minimization process outputs an unaligned layout latency, which is input to a sorting, alignment and L/R symmetry process 812 to produce an aligned layout routing. This, along with the unaligned layout latency is input to an evaluation process 814. The system then determines if the layout is optimum 816. If so, this layout is stored as the best layout 818, and if not, the system iterates over the minimization and evaluation steps by generating a new seed from the aligned best result 824. When the iteration limit is reached, as determined in step 820, the system outputs the unaligned layout and aligned layout routing latency 822.

Home-Theater Post-Processing

Though immersive audio (such as Atmos) may have been originally developed for movie programs played in cinema environments, it has been well adapted for home audio and smaller venue applications. Playing object-based audio in the home environment consists of audio signals being presented to the listener originating from in front of and around the listening position in the horizontal plane (main speakers) and overhead plane (height speakers). A full home enabled speaker system layout will typically consist of: front speakers (e.g., Left, Center, Right, and optionally Left Center, Right Center, Left Screen, Right Screen, Left Wide, and Right Wide), Surround speakers (e.g.: Left Surround, Right Surround, and optionally Left Surround 1, Right Surround 1, Left Surround 2, Right Surround 2), surround back speakers (e.g., Left Rear Surround, Right Rear Surround, Center Surround, and optionally Left Rear Surround 1, Right Rear Surround 1, Left Rear Surround 2, Right Rear Surround 2, Left Center Surround, Right Center Surround), height speakers (e.g., Left Front Height, Right Front Height, Left Top Front, Right Top Front, Left Top Middle, Right Top Middle, Left Top Rear, Right Top Rear, Left Rear Height, Right Rear Height), and subwoofer speakers. Different nomenclature and terminology may be used to distinguish the speakers in the defined array. Speakers come in various types as follows: a) in-room (traditional box speakers on a stand or in a cabinet); b) in-wall (traditionally mounted in the wall in the horizontal plane around the listener); c) on-wall (traditionally mounted on the wall in the horizontal plane around the listener); d) in-ceiling (traditionally mounted in the ceiling above the listener for the surrounds and far forward for the fronts); and e) on-ceiling (traditionally mounted on the ceiling above the listener for the surrounds and far forward for the fronts).

In an embodiment, the post-processing function 214 can be adapted to allow the autodiscovery process to be used for home theater (consumer) applications. With the speakers located, these positions may be used to optimize the spatial rendering of audio within a consumer playback environment. Atmos rendering takes as input a room configuration with speakers constrained to lie within a canonical room represented by a unit cube, such as shown in FIG. 6. As such, a technique for mapping the physical location of the speakers into these Atmos coordinates is needed. With the assumption that the listener is located at the origin with respect to the detected physical speaker coordinates, a simple mapping technique involves: (1) translating the origin (listening position) to the center floor of the canonical Atmos room (e.g., coordinate 0.5, 0.5, 0); and (2) scaling the x, y, and z coordinates of the speaker positions such that the speaker with the maximum absolute value of each coordinate lies on the respective wall of the canonical room. Using this technique guarantees that speakers span the entire extent of the canonical room. In some consumer applications the located speakers may be Atmos enabled speakers containing an additional upward firing driver for the purposes of reproducing overhead audio through acoustic reflection from the ceiling. In such a scenario it may be best to assume that all of the located speakers lie on the ground plane, in which case the Atmos z-coordinate of each speaker is forced to zero in the mapping described above. Additionally a virtual ceiling speaker location is created for each upward firing driver. The position of each virtual ceiling speaker may be computed by: (1) setting the Atmos z-coordinate equal 1 (on the ceiling); and (2) computing the Atmos x and y coordinate as an interpolation between the Atmos x and y coordinate of the associated speaker (computed above) and the listener position (0.5, 0.5, 0). The interpolation above accounts for the fact that the upward firing driver is angled slightly toward the listening position resulting in a ceiling reflection location lying between the physical speaker location and the listener position.

Figure 9:
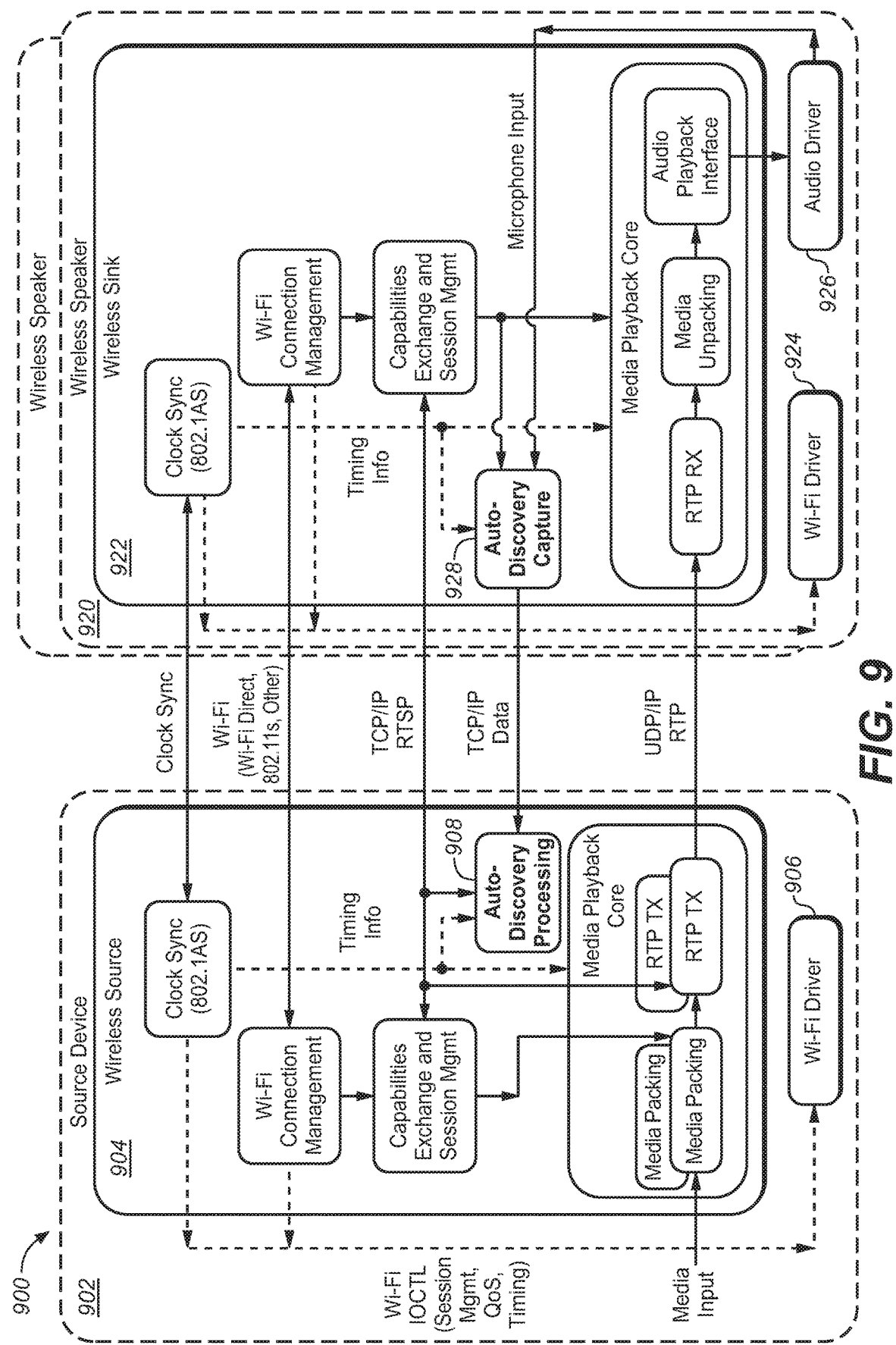
FIG. 9 illustrates an integrated system of wireless speakers under some embodiments.

A typical home or cinema application usually consists of a number of speakers physically wired to an AVR unit. In an embodiment, the autodiscovery system can be used in a wireless speaker system as well. An integrated system of wireless speakers may combine the components of FIG. 1 over a wireless protocol to achieve simplified calibration. FIG. 9 illustrates an integrated system of wireless speakers under some embodiments. This system is assumed to have bi-directional communication capabilities, implemented over Wi-Fi or a similar solution. One example implementation of this is a modified version of the Wi-Fi Display (Miracast) standard. For the embodiment of FIG. 9, a source device 902 has a wireless source component 904 and a Wi-Fi driver 906 for communication with one or more wireless speakers 920 that each include a wireless sink 922, a Wi-Fi driver component 924 and an audio driver 926. The wireless source 904 includes an autodiscovery component 908 that communicates with an autodiscovery capture process 928 in the wireless sink 922. In such a system, the following features may be supported: (1) discovery of one or more sinks (wireless speakers) and capabilities exchange using RTSP capabilities exchange over a TCP connection; (2) session management for streaming UDP/IP RTP packets from a source to multiple sinks; (3) capability to negotiate a common clock basis through a mechanism such as generalized Precision Time Protocol (gPTP), or IEEE 802.1AS; and (4) an ability to support additional reverse channel connections for transmitting content from sink to source.

Using such a system, calibration may be performed by the following sequence: (1) a user triggers calibration; (2) the system sources an RTSP calibration start message indicating a calibration will occur between start and stop timestamps using a common time basis; (3) the source wirelessly transmits the calibration audio sequence to all sinks; (4) the sinks capture the audio at the indicated start and stop times; (5) the sinks transmit captured audio back to the source through a reverse channel; (6) the source uses timestamps for captured audio to perform a preliminary alignment of captured audio.

Figure 10:
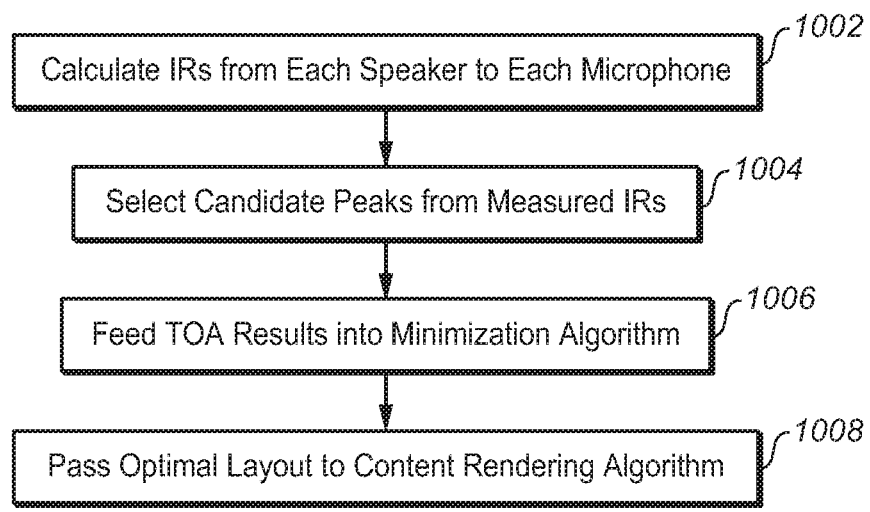
FIG. 10 is a flowchart that illustrates a method of performing autodiscovery in a wireless system under some embodiments.

Once calibration is completed, the autodiscovery process can be performed. FIG. 10 is a flowchart that illustrates a method of performing autodiscovery in a wireless system under some embodiments. In step 1002, the process calculates the impulse responses from captured audio from each speaker to each microphone using cross-correlation, modified cross-correlation, convolution or similar techniques. It then selects candidate peaks from measured impulse responses and stores candidates, plus alternatives, into a time-of-arrival matrix, step 1004. The process then feeds the non-linear optimization algorithm candidate time-of-arrival results into the minimization algorithm and minimizes the error for the cost function until an optimum solution is found, step 1006. It should be noted that the TOA matrix is fed to a minimization algorithm that is designed to deal with a multi-valued TOA matrix. The TOA matrix is derived as described above with reference to FIG. 2. The optimal layout is then found and passed to the content rendering algorithm, step 1008.

In an embodiment, the calibration audio can be chosen depending on the purpose of the calibration, such as autodiscovery only (might be inaudible), or autodiscovery and EQ (audible). For the wireless system, additional constraints may be applied as appropriate to further improve performance. These constraints include: (1) a subset of the microphones may be coincident with the speakers (e.g. microphones may be built into speaker enclosure); (2) a microphone, possibly as part of a smartphone, may be used to identify the main listening position; and (3) heuristics may be used to establish anchor points, thus preventing certain inversion issues. For the wireless application, additional considerations for the autodiscovery process may include the fact that the impulse response calculations and peak identification (TOA) could be performed directly on the hardware emitting or recording (e.g., wireless speaker, smartphone, etc.), or the recorded signals could be sent to the cloud where the impulse responses and peaks are calculated and a TOA matrix is created and sent back to the system.

Aspects of the methods and systems described herein may be implemented in an appropriate computer-based sound processing network environment for processing digital or digitized audio files. Portions of the immersive audio system may include one or more networks that comprise any desired number of individual machines, including one or more routers (not shown) that serve to buffer and route the data transmitted among the computers. Such a network may be built on various different network protocols, and may be the Internet, a Wide Area Network (WAN), a Local Area Network (LAN), or any combination thereof. In an embodiment in which the network comprises the Internet, one or more machines may be configured to access the Internet through web browser programs.

One or more of the components, blocks, processes or other functional components may be implemented through a computer program that controls execution of a processor-based computing device of the system. It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

Embodiments are further directed to systems and articles of manufacture that perform or embody processing commands that perform or implement the above-described method acts, such as those illustrated in the flowchart of FIG. 5.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for localizing speakers in a listening environment having a first number (n) speakers and a second number (m) microphones, comprising:
    receiving one or more respective times of arrival (TOA) for each speaker of the n speakers to each microphone of the m microphones to generate multiple TOA candidates;
    receiving configuration parameters of the listening environment;
    minimizing a cost function using each of the one or more respective TOA values of each speaker to estimate a position and latency of a respective speaker and microphone;
    iterating the cost function minimization over each TOA candidate of the multiple TOA candidates; and
    using the configuration parameters and minimized cost function to provide speaker location information to one or more post-processing or audio rendering components.

2. The method of claim 1, wherein the received TOA include multiple TOA candidates for at least one of the speakers to at least one of the microphones.

3. The method of claim 1, comprising:
    estimating an impulse (IR) of the listening environment based on a reference audio sequence played back by one or more of the speakers and a recording of the reference audio sequence obtained from one or more of the microphones; and
    using the IR to search for direct sound candidate peaks, wherein the multiple TOA candidates correspond to respective candidate peaks identified in the search, wherein the speaker location information provided to one or more post-processing or audio rendering components is based on a selection among the TOA candidates for which a residual of the minimizing step is below a certain threshold value.

4. The method of claim 1, comprising:
    estimating an impulse response (IR) of the listening environment by one of: cross-correlating a known reference audio sequence to a recording of the sequence obtained from the microphones to derive a pseudo-impulse response, or deconvolving a calibration audio sequence and a recording of the calibration audio sequence obtained from the microphones;
    using the IR to search for direct sound candidate peaks by evaluating a reference peak and using noise levels around the reference peak, wherein the multiple TOA candidates correspond to respective candidate peaks identified in the search; and
    performing a multiple peak evaluation by selecting an initial TOA matrix, evaluating the initial matrix with residuals of the minimizing step, and changing TOA matrix elements until the residuals are below a defined threshold value.

5. The method of claim 4, wherein using the IR to search for direct sound candidate peaks includes:
    searching for alternative peaks at least in a portion of the IR located before the reference peak.

6. The method of claim 1 wherein the latency comprises a playback latency for at least one speaker.

7. The method of claim 1, wherein the latency comprises a recording latency for at least one microphone.

8. The method of claim 1, wherein the configuration parameters comprise at least one of: the numbers n and m, a size of the listening environment; bounds on the playback and recording latencies; a specification of two-dimensional or three-dimensional speaker location; constraints on speaker and microphone relative positioning; constraints on speaker and microphone relative latencies; and references to disambiguate rotation, translation and axes inversion symmetries.

9. The method of claim 1 further comprising providing a seed layout to the cost function, the seed layout specifying the correct number n and m of speakers and microphones in defined initial positions relative to a defined speaker layout standard.

10. The method of claim 1 further comprising transforming the estimated location information into a canonical format based on a configuration of the speakers in the listening environment.

11. The method of claim 1 wherein the speakers in the listening environment are placed in a surround-sound configuration having a plurality of front, rear and surround speakers and one or more low frequency effect speakers, and wherein at least some speakers are height speakers providing playback of height cues present in an input audio signal comprising immersive audio content.

12. The method of claim 1 wherein obtaining the one or more respective TOA values may be performed using at least one of: a room calibration audio sequence emitted sequentially by each of the n speakers and recorded simultaneously by the m microphones; a calibration audio sequence band-limited to the close ultrasonic range, such as 18 to 24 kHz; an arbitrary multichannel audio sequence; and a specifically defined multichannel audio sequence, to recover a room impulse response from a multichannel audio sequence.

13. The method of claim 12 further comprising using the estimated speaker location information to modify a rendering process transmitting speaker feeds to each speaker, and wherein the listening environment comprises one of a large venue playing cinema content, or a home theater, and wherein at least some of the speakers comprise wireless speakers coupled to a renderer executing the rendering process over a wireless data network.

14. The method of claim 1 further comprising:
    estimating an impulse response (IR) of the listening environment by one of: cross-correlating a known reference audio sequence to a recording of the sequence obtained from the microphones to derive a pseudo-impulse response, or deconvolving a calibration audio sequence and a recorded audio program; and
    estimating one or more best TOA candidates from at least one of the estimated IR or pseudo-IR using an iterative peak-searching algorithm.

15. The method of claim 1 further comprising:
    using residual values of the minimizing step to provide an estimate of the internal coherence of the original TOA values; and generating an error estimate to allow for iterating over the cost function minimization process to improve the estimated location.

16. The method of claim 1 wherein the TOA values are formatted into a matrix of dimension n by m.

17. The method of claim 1 wherein the step of receiving the TOA values for each speaker each of microphone using the multiple TOA candidates comprises:
   deconvolving a calibration audio sequence sent to each speaker to obtain a room impulse response (IR);
   using the IR to search for direct sound candidate peaks by evaluating a reference peak and using noise levels around the reference peak; and
   performing a multiple peak evaluation by selecting an initial TOA matrix, evaluating the initial matrix with residuals of the minimizing step, and changing TOA matrix elements until the residuals are below a defined threshold value.

18. The method of claim 1 wherein the minimizing step is performed using a nonlinear minimization algorithm using an Interior Point Optimize software library in an executable software program.

19. The method of claim 17 further comprising explicitly providing explicit first derivatives (Jacobian) and second derivatives (Hessian) of the cost functions and constraints with respect to unknowns of the cost function.

20. A system for determining locations of speakers in a room, comprising:
   a first component determining times-of-arrival for each of n speakers and m microphones placed in the room and obtaining defined configuration parameters and a seed layout of the speakers;
   a second component minimizing a cost function using the times of arrival to solve for the locations of the speakers and microphones and a playback latency of each speaker and a recording latency for each microphone; and
   a third component using the minimized cost function output and the configuration parameters and seed layout to generate an estimated location of the speakers and microphones, an estimated latency for each speaker, and an evaluation of the quality of the results to provide input to a renderer transmitting speaker feeds to the speakers or a user interface providing output to a user.

21. A non-transitory computer-readable medium with instructions for performing the method of claim 1.

* * * * *